United States Patent [19]

Yamazaki et al.

[11] Patent Number: 4,592,206
[45] Date of Patent: Jun. 3, 1986

[54] ROOM-WARMING/COOLING AND HOT-WATER SUPPLYING HEAT-PUMP APPARATUS

[75] Inventors: Kisuke Yamazaki, Kamakura; Michio Otsubo, Fujisawa; Keiko Okuma, Machida, all of Japan

[73] Assignee: Mitsubishi Denki Kabushiki Kaisha, Tokyo, Japan

[21] Appl. No.: 699,128

[22] Filed: Feb. 7, 1985

[30] Foreign Application Priority Data

| Feb. 9, 1984 | [JP] | Japan | 59-23245 |
| May 9, 1984 | [JP] | Japan | 59-94892 |
| May 10, 1984 | [JP] | Japan | 59-94963 |
| May 15, 1984 | [JP] | Japan | 59-99187 |
| May 15, 1984 | [JP] | Japan | 59-99188 |
| Jun. 13, 1984 | [JP] | Japan | 59-124084 |
| Oct. 12, 1984 | [JP] | Japan | 59-214903 |
| Oct. 23, 1984 | [JP] | Japan | 59-224772 |
| Oct. 30, 1984 | [JP] | Japan | 59-230603 |
| Oct. 30, 1984 | [JP] | Japan | 59-230604 |

[51] Int. Cl.$^4$ .................. F25B 13/00; F25B 27/00
[52] U.S. Cl. .................. 62/160; 62/228.4; 62/238.6; 62/324.6
[58] Field of Search .......... 62/160, 238.6, 238.7, 62/324.6; 237/2 B

[56] References Cited

U.S. PATENT DOCUMENTS

| 4,299,098 | 11/1981 | Derosier | 62/324.6 |
| 4,507,938 | 4/1985 | Hama et al. | 62/238.6 |

OTHER PUBLICATIONS

"Water Heater Attached to the Packaged Air Conditioner", Refrigerator vol. 58, No. 671, pp. 25 to 29, published 9/83.

"Cooling, Heating & Hot Water Heat Pump Unit", Refrigeration vol. 58, No. 671, pp. 14 to 18, published in Sep., 1983.

"A Feature of Construction of Water Heating Heat Pump", Refrigeration vol. 58, No. 671, pp. 19 to 24, published in 9/83.

"Q & A Concerning Heat Pump for Buildings", Japan Refrigeration Air-Conditioning Industrial Association, published Mar., 1982.

Primary Examiner—William E. Wayner
Attorney, Agent, or Firm—Oblon, Fisher, Spivak, McClelland & Maier

[57] ABSTRACT

A room-warming/cooling and hot-water supplying heat-pump apparatus comprises a refrigerant circuit provided with a compressor, a four-way valve for switching room warming and cooling operations, a room side heat exchanger, a reversible flow type expansion device and an outdoor side heat exchanger, wherein a first switching means is connected to the outlet side of the compressor; a first branch of the switching means is connected to the four-way valve and a second branch of the first switching means is connected to one end of a heating coil in a hot water tank; the other end of the heating coil extends out of the hot water tank and has a branched part. A pipeline including the branched part has both ends connected to the refrigerant circuit at both sides of the expansion device in which at least one valve means is provided in the pipeline including the branched part and the first switching means and the valve means are controlled by a control device.

16 Claims, 25 Drawing Figures

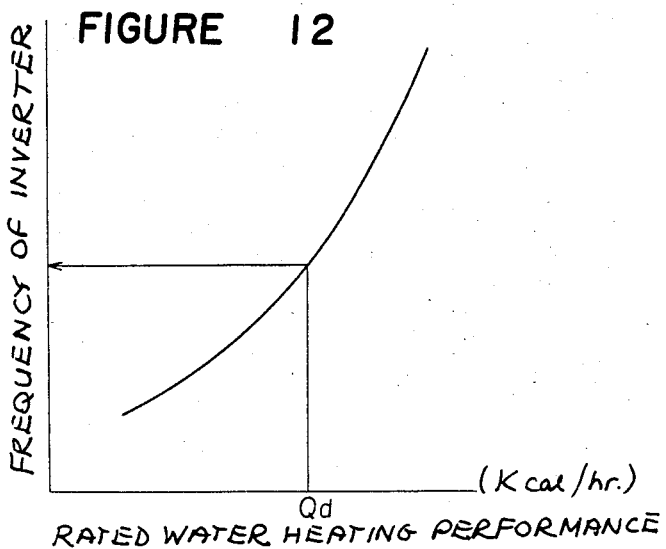
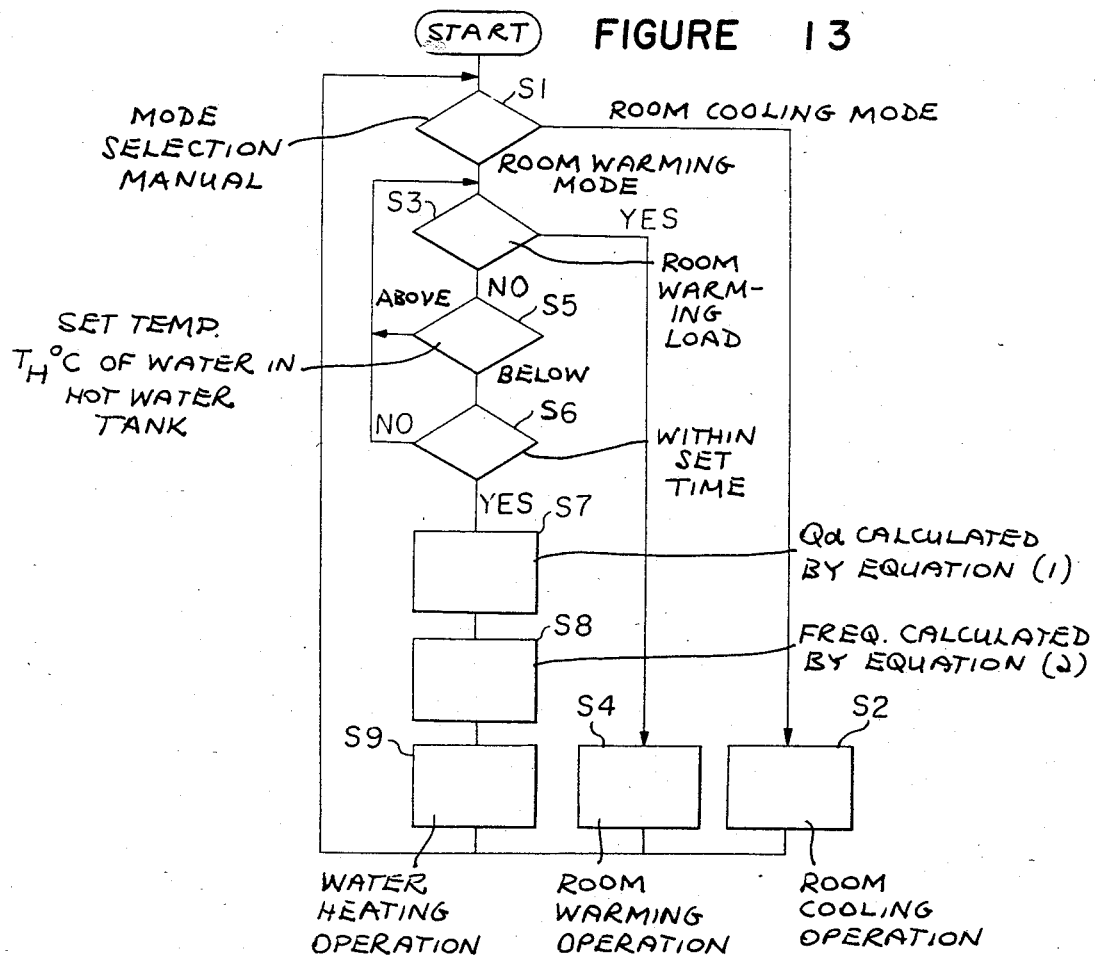

DETECTORS FOR DETECTING REMAINING WATER (LOWERMOST DETECTOR INDICATING TEMP. HIGHER THAN PREDETERMINED TEMPERATURE)

AMOUNT OF WATER REMAINING IN HOT WATER TANK

ROOM-WARMING/COOLING AND HOT-WATER SUPPLYING HEAT-PUMP APPARATUS

The present invention relates to a room-warming/cooling and hot-water supplying heat-pump apparatus performing both operations of room-warming and cooling and water heating.

There have been proposed a heat pump for warming and cooling a room as shown in FIG. 1 and a heat pump for performing room-warming/cooling and hot-water supplying.

Refrigerant circuits of heat pump apparatuses as shown in FIGS. 1 and 2 are respectively provided with a compressor 1, a four-way valve 2 for switching warming and cooling operations for a room, a room side heat exchanger 3, an expansion device 4 and a outdoor side heat exchanger 5.

In the heat pump apparatus in FIG. 1, a plurality of room side heat exchangers 3 are connected in parallel through respective electromagnetic valves 13 to the refrigerant circuit between the expansion device 4 and the four-way valve 2.

In FIG. 2, a reference numeral 6 designates a hot water tank, a numeral 8 designates a heating coil for heating water in the hot water tank 6, a numeral 14 designates an inlet for city water to be supplied to the hot water tank 6 and numeral 15 designates a faucet for hot water supply. In the heat pump apparatus shown in FIG. 2, the room side heat exchanger 3 and the heat coil 8 are provided in the refrigerant circuit in parallel arrangement between the expansion device 4 and the four-way valve 2. The room side heat exchanger 3 and the heating coil 8 are connected to the four-way valve 2 through each of the electromagnetic valves 13.

The operations of the heat pump apparatuses in FIGS. 1 and 2 will be described.

The heat pump apparatus shown in FIG. 1 is adapted to perform warming and cooling operations for two rooms. In the cooling operation, a refrigerant gas of high temperature and high pressure discharged from the compressor 1 flows through the four-way valve 2 to the outdoor side heat exchanger 5, as shown by the solid arrow mark, where it is cooled for condensation. The condensed, highly pressurized refrigerant liquid is subjected to reduction in pressure at a first expansion valve 4a of the expansion device 4. The electromagnetic valves 13 for the room side heat exchangers 3 are opened to flow the refrigerant when there is presence of load. Then, a low pressure refrigerant liquid fed from the expansion valve 4a evaporates in the room side heat exchangers 3 at the time of which it takes heat and becomes gas. The low pressure refrigerant gas is passed through the four-way valve 2 and is sucked into the compressor 1 where it is again compressed. Thus, the cycle as above-mentioned is repeated.

In the warming operation, the refrigerant gas of high temperature and high pressure discharged from the compressor 1 is passed through the four-way value 2 to the room side heat exchangers 3, as shown in the broken arrow mark, where it emits heat to be condensed; thus, the room warming operation is performed. The condensed, highly pressurized refrigerant liquid is subjected to reduction in pressure at a second expansion value 4b of the expansion device 4. The refrigerant liquid of low pressure is then fed to the outdoor side heat exchanger 5, where it is heated by the atmosphere to be evaporated. The low pressure refrigerant gas is passed through the four-way value 2 and is sucked into the compressor 1 for compression. The cycle as above-mentioned is repeated for the room warming operation.

In the heat pump apparatus shown in FIG. 2, one of the room side heat exchangers as shown in FIG. 1 is replaced by the heating coil 8 of the hot water tank 6. In a water heating operation, the four-way valve 2 is turned to the room warming side and the electromagnetic valve 13 at the side of the room side heat exchanger 3 is closed while the electromagnetic valve 13 at the side of heating coil 8 is opened.

In the room warming operation or the room cooling operation, the electromagnetic valve 13 at the side of the room side heat exchanger 3 is opened and the electromagnetic valve 13 at the side of the heating coil 8 is closed. The operation of the heat pump apparatus shown in FIG. 2 is the same as those in FIG. 1 except for the above-mentioned operation.

However, the conventional heat pump apparatus as shown in FIG. 2 is such disadvantage that it is impossible to heat water in the hot water tank 8 by recovering waste heat at the time of the room cooling operation since water in the hot water tank 8 has to be heated by the heating coil 8 which is arranged in parallel to the room side heat exchanger 3.

It is an object of the present invention to eliminate the disadvantage of the conventional heat pump apparatus and to provide a room-warming/cooling and hot-water supplying heat-pump apparatus which performs simultaneous operation for warming or cooling a room and supplying hot water and which heats water in a hot water tank by recovering waste heat during the room cooling operation.

The foregoing and the other objects of the present invention have been attained by providing a room-warming/cooling and hot-water supplying heat-pump apparatus comprising a refrigerant circuit provided with a compressor, a four-way valve for switching room warming and cooling operations, a room side heat exchanger, a reversible flow type expansion device and an outdoor side heat exchanger, characterized in that a first switching means is connected to the outlet side of the compressor; a first branch of the switching means is connected to the four-way valve and a second branch of the first switching means is connected to one end of a heating coil in a hot water tank; the other end of the heating coil extends out of the hot water tank and has a branched part, wherein a pipeline including the branched part has both ends connected to the refrigerant circuit at both sides of the expansion device in which at least one valve means is provided in the pipeline including the branched part and the first switching means and the valve means are controlled by a control device.

FIG. 12 is a diagram showing a relationship of the frequency of an inverter to a rated heat performance in the room-warming/cooling and hot-water supplying heat-pump apparatus of the present invention;

FIG. 13 is a flow chart showing a flow of the operation of the fifth embodiment of the present invention;

Figure 1:
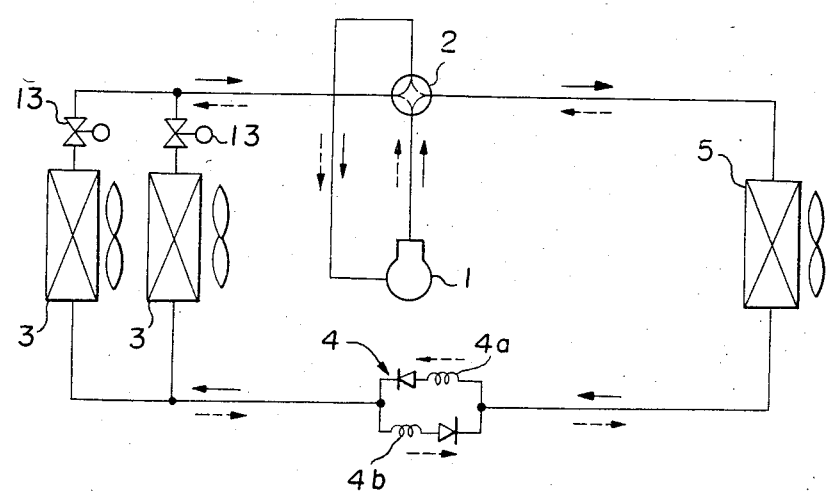
FIG. 1 is a diagram of a conventional room-warming/cooling heat pump apparatus.
Figure 2:
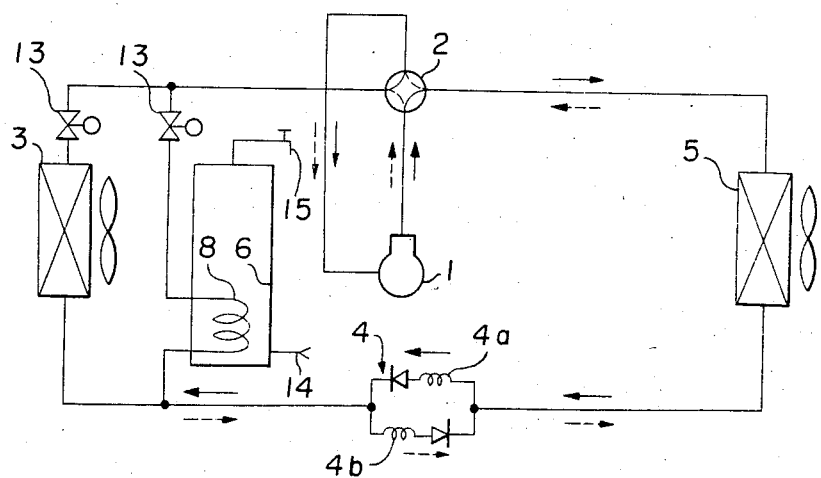
FIG. 2 is a diagram of a conventional room-warming/cooling and hot-water supplying heat-pump apparatus.
Figure 3:
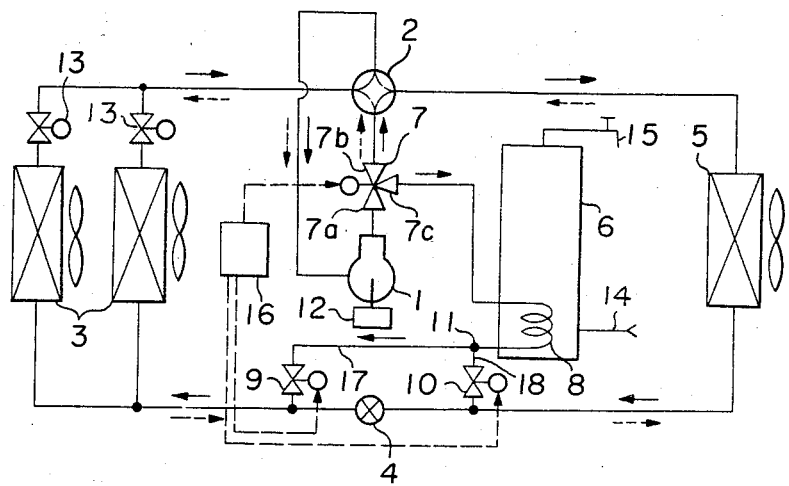
FIG. 3 is a diagram of an embodiment of the room-warming/heating and hot-water supplying heat-pump apparatus according to the present invention.

The first embodiment of the present invention will be described with reference to FIG. 3. In FIG. 3, there are provided a compressor 1, a four-way valve 2 for switching warming and cooling operations for a room, a room side heat exchanger 3, an expansion device 4 and an outdoor side heat exchanger 5 in a refrigerant circuit as are in the conventional apparatus. A three-way valve 7 for switching the flow of refrigerant is provided at the discharge side of the compressor 1 in the refrigerant circuit. A first branch 7b of the three-way valve 7 is connected to the four-way valve 2 and a second branch 7c is connected to a heating coil 8 placed in a hot water tank 6. A pipeline 17 has a branched part 11 at the outlet side of the heating coil 8 and is connected to the refrigerant circuit between the expansion device 4 and the room side heat exchanger 3 through a first electromagnetic valve 9. A pipeline 18 branched from the branched part 11 is connected to the refrigerant circuit between the expansion device 4 and the outdoor side heat exchanger 5 through a second electromagnetic valve 10. In FIG. 3, a reference numeral 12 designates an inverter for performing capacity control of the compressor 1, a numeral 13 designates electromagnetic valves for the room side heat exchangers 3, a numeral 4 designates an inlet for city water, a numeral 15 designates a faucet for hot water and a numeral 16 designates a control device for controlling the three-way valve 7 and the electromagnetic valves 9, 10.

The operation of the heat pump apparatus of the first embodiment will be described.

In a room a warming operation, an inlet 7a and the first branch 7b of the three-way valve 7 are communicated and refrigerant gas discharged from the compressor 1 flows from the branch 7b through the four-way valve 2 to one or both of the room side heat exchangers 3 as shown by the broken arrow mark in FIG. 3. The refrigerant gas is condensed in the room side heat exchangers to be refrigerant liquid, which is passed through the expansion device 4 to the outdoor side heat exchanger 5 for evaporation. The evaporated refrigerant is returned to the compressor 1 through the four-way valve 2 as shown by the broken arrow mark.

In a room warming and water heating operation, the refrigerant gas discharged from the compressor 1 is passed, in one part, to the room side heat exchangers through the four-way valve 2 and is passed, in the other part through the second branch 7c of the three-way valve 7 to the heating coil 8 by switching operations of the three-way valve 7. The refrigerant gas in the heating coil 8 heats water in the hot water tank 6 and causes condensation to be refrigerant liquid. The refrigerant liquid is passed through the electromagnetic valve 9 to the refrigerant circuit where it is combined with refrigerant liquid fed from the room side heat exchangers 3. Then, the combined refrigerant liquid is returned to the compressor 1 through the expansion device 4, the outdoor side heat exchanger 5 and the four-way valve 2 in the same manner as the room warming operation. Another way of the room warming and water heating operation is such that the inlet 7a and the first branch 7b of the three-way valve 7 are communicated as are in the room warming operation; a room temperature detector (not shown) such as a thermostat is provided to detect room temperature; when the room temperature rises to a predetermined value, the three-way valve 7 is switched to communicate the inlet 7a with the second branch 7c to heat water in the hot water tank 6 by the heating coil 8 and when the room temperature is below the predetermined value, the three-way valve 7 is switched to return the room warming operation; thus, the room warming operation and water heating operation are selectively performed. Further, the three-way valve 7 is switched at a small time interval by using a timer to communicate the inlet 7a with the first branch 7b and to communicate the inlet 7a with the second branch 7c whereby the refrigerant is supplied for room warming or water heating operation alternately.

In a room cooling operation, the inlet 7a and the first branch 7b of the three-way valve 7 are communicated and the refrigerant gas discharged from the compressor 1 is passed through the four-way valve 2 to the outdoor side heat exchanger 5, as shown by the solid arrow mark, where the refrigerant gas is condensed to be refrigerant liquid. The refrigerant liquid is then, passed through the expansion device 4 to one or two room side heat exchangers 3. Refrigerant gas formed by its evaporation in the heat exchangers 3 is returned to the compressor 1 through the four-way valve 2 as shown in the solid arrow mark.

In a room cooling and water heating operation, the inlet 7a and the second branch 7c of the three-way valve 7 are communicated and the refrigerant gas discharged from the compressor 1 is fed to the heating coil 8 to heat water in the hot water tank 6; the refrigerant liquid formed by condensation in the heating coil 8 is supplied to the expansion device 4 through the electromagnetic valve 10 provided in the pipeline 18 and enters into one or both of the room side heat exchangers 3 where it is evaporated to be refrigerant gas. The refrigerant gas is returned to the compressor 1 through the four-way valve 2 as shown by the solid arrow mark.

In a water heating operation, the refrigerant gas is passed from the inlet 7a through the branch 7c of the three-way valve 7 to the heating coil 8. The refrigerant gas is condensed by heating water in the hot water tank 6 and is fed to the outdoor side heat exchanger 5 through the electromagnetic valve 9 and the expansion device 4. The refrigerant liquid evaporates in the outdoor side heat exchanger 5 to be refrigerant gas, which is returned to the compressor 1 through the four-way valve 2.

The operations of room warming, room warming and water heating, room cooling, room cooling and water heating, and water heating are carried out by controlling the three-way valve 7, the electromagnetic valves 9, 10, the four-way valve 2 and the electromagnetic valves 13 by means of the control device 16. Capacity control of the compressor 1 is performed by changing the frequency of a power souce for the compressor 1 by means of the inverter 12.

Thus, in the first embodiment of the present invention having the construction as above-mentioned, both functions of warming and cooling of plural rooms and water heating can be attained simultanesously and water in the hot water tank is heated by waste heat at the time of room cooling with a simple arrangement of pipelines.

Figure 4:
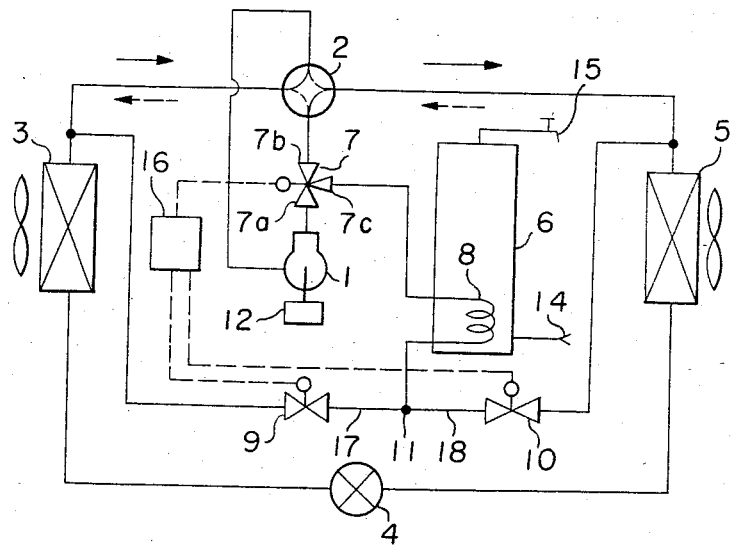
FIG. 4 is a diagram of the second embodiment of the present invention.

The second embodiment of the present invention will be described with reference to FIG. 4. In FIG. 4, the same reference numerals as in FIG. 3 designate the same or corresponding parts and therefore description of these parts is omitted.

A pipeline extending from the heating coil 8 has a branched part 11 at the outlet side of the heating coil 8. A pipeline 17 extending from the branched part 11 is connected to the refrigerant circuit between the four-way valve 2 and the room side heating exchanger 3 through a first electromagnetic valve 9 and the other pipeline 18 extending from the branched part 11 is connected to the refrigerant circuit between the four-way valve 2 and the outdoor side heating exchanger 5 through the second electromagnetic valve 10.

The operation of the heat pump apparatus of the second embodiment will be described.

A room warming and room cooling operation is the same as that of the first embodiment described with reference to FIG. 3.

In a room warming and water heating operation, by switching three-way valve 7, a part of the refrigerant gas is supplied to the room side heat exchanger 3 and the other part is supplied to the heating coil 8 to heat water in the hot water tank 6. In the heating coil 8, a part of the refrigerant gas may remain in a gaseous state without causing condensation. The refrigerant liquid including gaseous refrigerant is passed through the electromagnetic valve 9 to the refrigerant circuit between the four-way valve 2 and the room side heating exchanger 3 where it is combined with refrigerant liquid flowing to the room side heating exchanger 3. The behavior of the refrigerant in the downstream side of the room side heat exchanger 3 is the same as that in the room warming operation.

In the room warming and water heating operation, there is selective operation for room warming and water heating by providing a room temperature detector (not shown) such as a thermostat in the same manner as described in the first embodiment. Further, it is possible to switch the inlet 7a of the three-way valve 7 to the first and the second branches 7b, 7c at a small time interval by means of a timer to perform alternate room warming and water heating operations.

In the room cooling and water heating operation in which the refrigerant gas is passed through the second branch 7c to the heating coil 8 to heat water in the hot water tank 6 and then is supplied to the outdoor side heat exchanger 5 through the electromagnetic valve 10, the refrigerant being subjected to expansion in the expansion device 4 and then fed to the room side heat exchanger 3 for the room cooling operation.

In this case, further effective operation can be attained by adjusting the capacity of the outdoor side heat exchanger 5 so that revolution of a blower for the outdoor side heat exchanger is stopped or revolution of the blower is changed depending on a state of liquefaction of the cooling medium. Thus, it is possible to recover waste heat at the time of cooling of a room (the waste heat having not been utilized in the conventional heat pump) as a heating source for water in the hot water tank.

In the water heating operation, the refrigerant gas is passed through the second branch 7c of the three-way valve 7 to the heating coil 8 to heat water in the hot water tank. In this case, the refrigerant gas is partly or entirely condensed. In this embodiment, a flowing path of the refrigerant can be selected depending on a state of condensation of the refrigerant or atmospheric temperature. Namely, when atmospheric temperature is relatively low, the flow path of the refrigerant flowing at the time of the room warming and water heating operation is taken, while atmospheric temperature is relatively high, a flow path at the time of the room cooling and water heating operation is taken. More specifically, when atmospheric temperature is relatively low, the refrigerant flows in the course of the electromagnetic valve 9, the room side heat exchanger 3, the expansion device 4 and the outdoor side heat exchanger 5. The refrigerant becomes gaseous state due to evaporation and the refrigerant gas is returned to the compressor 1 through the four-way valve 2.

In the second embodiment, the operations as abovementioned can be performed by controlling the three-way valve 7, the electromagnetic valves 9, 10 and the four-way valve 2 by using the control device 16. Capacity control of the compressor 1 in the refrigerant circuit can be conducted by changing frequency of a power source for driving the compressor 1 by means of an inverter 12.

Figure 5:
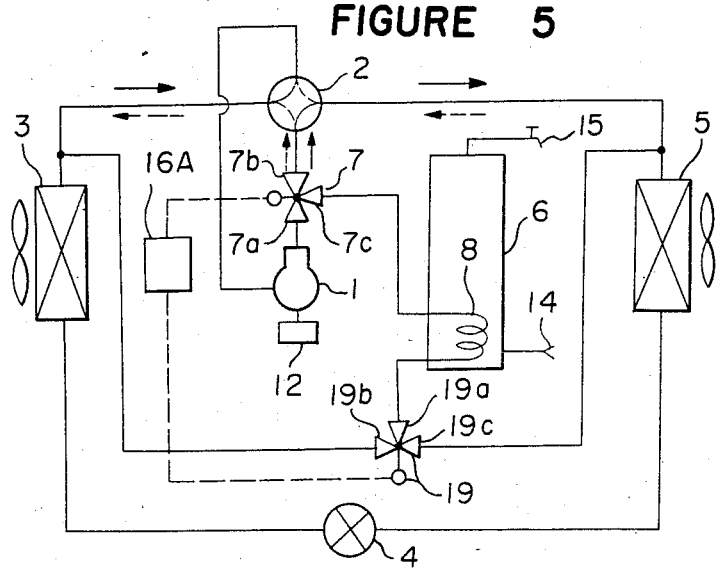
FIG. 5 is a diagram of the third embodiment of the present invention.

The third embodiment of the present invention will be described with reference to FIG. 5. In FIG. 5, the same reference numerals as in FIGS. 3 and 4 designate the same or corresponding parts and therefore description of these parts is omitted.

The refrigerant circuit of the third embodiment has a second three-way valve 19 for switching the direction of flowing of the refrigerant. An inlet 19a of the three-way valve 19 is connected to the outlet side of the heating coil 8; a first branch 19b is connected to the refrigerant circuit between the four-way valve 2 and the room side heating exchanger 3 and a second branch 19c is connected to the refrigerant circuit between the four-way valve 2 and the outdoor side heat exchanger 5.

The room warming operation and the other operation of the third embodiment are the same as that of the second embodiment provided that a control device 16A controls the first three-way valve 7, the four-way valve 2 and the second three-way valve 19 which is positioned instead of the electromagnetic valves 9, 10. Further, capacity control of the compressor 1 is performed by changing a power source for the compressor 1 by means of the inverter 12.

Figure 6:
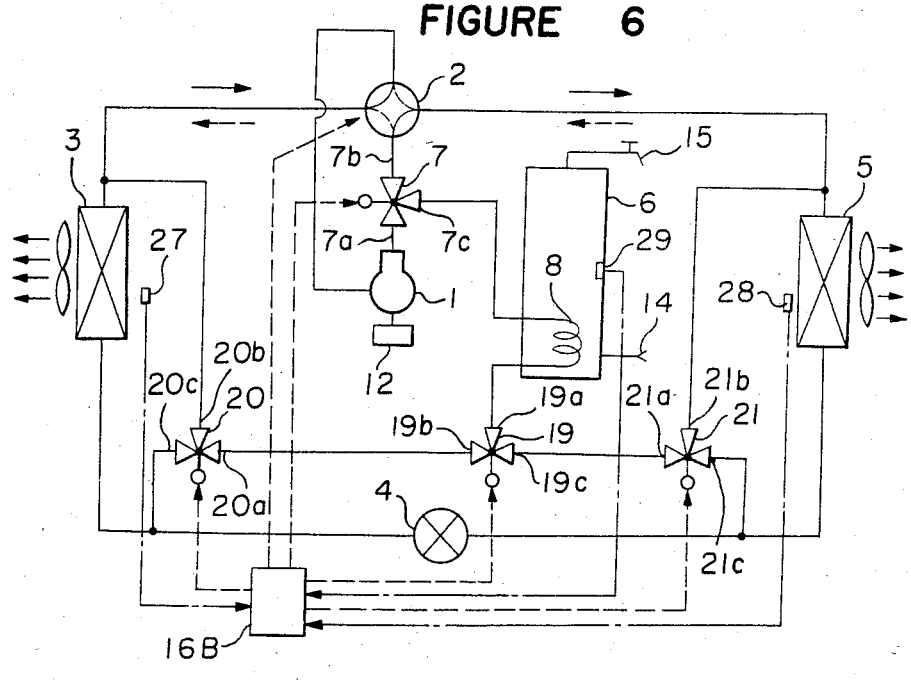
FIG. 6 is a diagram of the fourth embodiment of the present invention.

The fourth embodiment of the present invention will be described with reference to FIG. 6. In FIG. 6, the same reference numerals as in FIGS. 3 to 5 designate the same or corresponding parts and therefore description of these parts is omitted.

In the fourth embodiment, there is also provided the second three-way valve 19 which is connected to the outlet side of the heating coil 8 through a inlet 19a. A first branch 19b of the second three-way valve 19 is connected to an inlet 21a of a third three-way valve 20 and a second branch 19c of the second three-way valve 19 is connected to an inlet 21a of a fourth three-way valve 21. A first branch 20b of the third three-way valve 20 is connected to the pipeline between the four-way valve 2 and the room side heating exchanger 3 and the second branch 20c is connected to the pipeline between the room side heat exchanger 3 and the expansion device 4. A first branch 21b of the fourth three-way valve 21 is connected to the pipeline between the four-way valve 2 and the outdoor side heat exchanger 5 and a second branch 21c of the fourth three-way valve is connected to the pipeline between the outdoor side heat exchanger 5 and the expansion device 4.

A reference numeral 16B designates a control device for controlling the first to the fourth three-way valves 7, 19, 20, 21 and the four-way valve 2. A numeral 27 designates a temperature detector for detecting room temperature in which a PTC thermister 27a is used for a room warming operation and an NTC thermister 27b is used for a room cooling operation. A numeral 28 designates a temperature detector consisting of a PTC thermister for detecting atmospheric temperature and a numeral 29 designates a temperature detector consisting of a PTC thermister for detecting temperature of hot water in the hot water tank.

Figure 7:
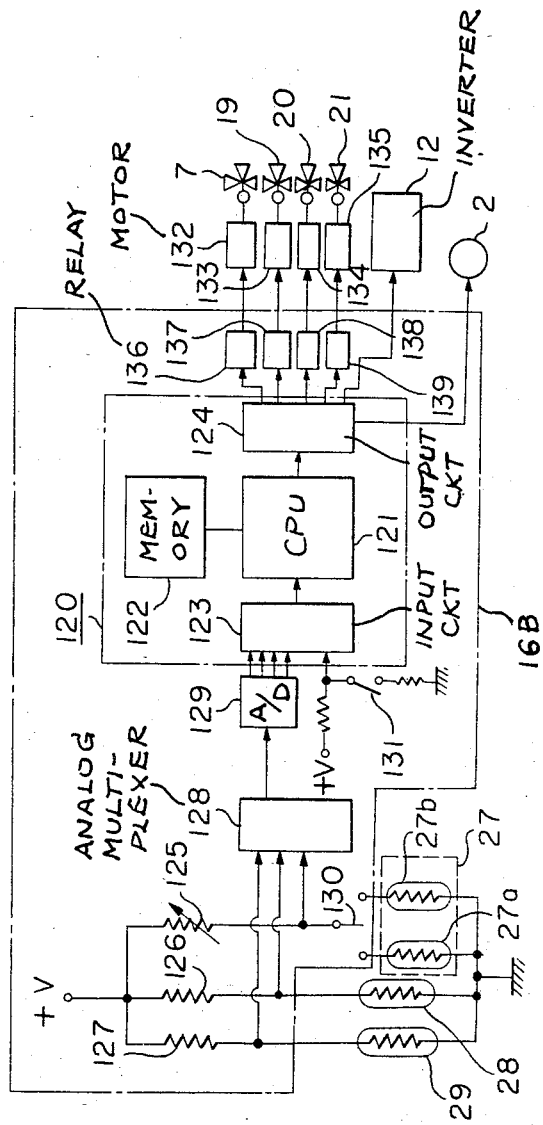
FIG. 7 is an electric circuit diagram of the control device used in the fourth embodiment of the present invention.
Figure 8:
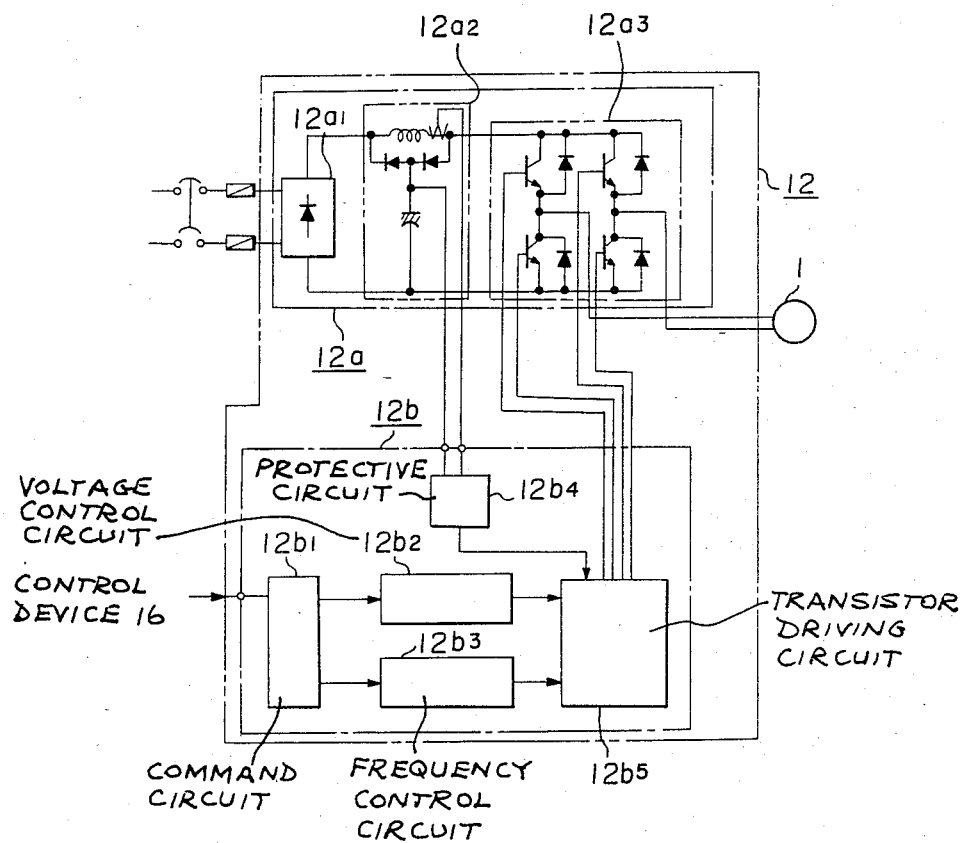
FIG. 8 is an electric circuit diagram of an inverter used in the fourth embodiment.

The control device 16B is constructed as shown in FIG. 7 in which a microcomputer 120 comprises a CPU 121, a memory 122, an input circuit 123, and an output circuit 124. Resistors 125, 126, 127 are respectively connected in series to the temperature detector 27, 28, 29. A numeral 128 designates an analogue multiplexer receiving the detected output of each of temperature detectors 27, 28, 29; a numeral 129 designates an A/D transducer for transducing the output of the multiplexer 128 into a digital form and the output of the A/D transducer is supplied to the input circuit 123. A numeral 130 designates a switch for switching room warming/cooling operations and a numeral 131 designates a switch for supplying hot water, the signal from the switch being supplied to the input circuit 123. Each of the three-way valves 7, 19, 20, 21 is actuated by each motor 132, 133, 134 or 135 which is driven by actuation of each relay 136, 137, 138 or 139. All the relays are connected to the output circuit 124. An inverter 12 is connected to the output circuit 124 and the four-way valve 2 is also connected to the output circuit 124. As shown in FIG. 8, the inverter 12 is constituted by a main circuit 12a and a control circuit 12b, and the main circuit 12a comprises a rectifying circuit $12a_1$, a current detection circuit $12a_2$ and a transistor inverter $12a_3$. The control circuit 12b comprises a command circuit $12b_1$ for receiving a signal from the control device 16B, a voltage control circuit $12b_2$, and a frequency control circuit $12b_3$, a current detection circuit $12b_4$ and a transistor driving circuit $12b_5$ for controlling the transistor inverter $12a_3$ by receiving signals from the voltage control circuit $12b_2$, the frequency control circuit $12b_3$ and the current detection circuit $12b_4$.

The operations of the fourth embodiment of the present invention will be described.

The operations of the room-warming and room-cooling are the same as described in the foregoing embodiments.

In a room warming and water heating operation, a part of the refrigerant gas is supplied to the heating coil 8 through the second branch 7c by switching the first three-way valve 7 to heat water in the hot water tank 6. In this case, when temperature of water in the hot water tank 6 is relatively low and the refrigerant having been passed through the heating coil 8 is in liquid condition, the third three-way valve 20 is controlled so that the inlet 20a is communicated with the second branch 20c, whereby the refrigerant liquid is combined with refrigerant liquid supplied from the room side heat exchanger 3 in the refrigerant circuit.

When temperature of water in the hot water tank 6 is relatively high and the refrigerant is not sufficiently liquefied, the third three-way valve 20 is so controlled that the inlet 20a is communicated with the first branch 20b, whereby the refrigerant passing through the heating coil 8 is combined with refrigerant gas of high temperature and high pressure supplied from the compressor 1 and the combined refrigerant is supplied to the room side heat exchanger 3. The refrigerant passed through the room side heat exchanger 3 is returned to the compressor 1 through the expansion device 4, the outdoor side heat exchanger 5 and the four-way vlave 2 as is in the room warming operation. In this embodiment, the signal for controlling the third three-way valve 20 depend on temperature in the hot water tank 6; however, it is possible to use temperature of the refrigerant flowing in the pipeline between the second three-way valve 19 and the third three-way valve 20.

In a room warming and water heating operation, the inlet 7a is communicated with the first branch 7b of the first three-way valve 7 and the room temperature detector 27 such as a thermister is provided in a room. When the detector 27 detects a room temperature higher than a predetermined value, the first three-way valve 7 is switched to communicate the inlet 7a with the second branch 7c to stop the warming operation and at the same time to heat water in the hot water tank 6 by the heating coil 8. When a room temperature decreases below the a 5 predetermined value, heating operation for the hot water tank 6 is stopped and the room warming operation is started; thus the room warming operation and the water heating operation are selectively performed. It is possible to control so that the first three-way valve 7 is switched by a timer at a small time interval to communicate the inlet 7a with the first branch 7b and to communicate the inlet 7a with the second branch 7c alternately; thus, the refrigerant is used for the room warming operation and the water heating operation alternately. In this case, the third three-way valve 20 can be controlled depending on liquefaction of the refrigerant as described before.

In a room cooling and water heating operation, the refrigerant gas discharged from the compressor 1 is fed to the heating coil 8 through the second branch 7c of the three-way valve 7 to heat water in the hot water tank 6. In the heating operation, the refrigerant gas is partly or entirely condensed and the refrigerant reaches the inlet 21a of the fourth three-way valve 21 through the inlet 19a and the second branch 19c of the second three-way valve 19. When the temperature of water in the hot water tank 6 is relatively high and the refrigerant is not sufficiently condensed, the inlet 21a of the fourth three-way valve 21 is communicated with the first branch 21b. Accordingly, the partly liquefied refrigerant is combined with refrigerant gas of high temperature and high pressure supplied from the compressor 1 through the four-way valve 2 and the combined refrigerant is fed to the outdoor side heat exchanger 5 where the refrigerant is entirely condensed for liquefaction and then is fed to the expansion device 4. When the temperature of water in the hot water tank 6 is relatively low and the refrigerant gas is sufficiently liquefied, the inlet 21a of the three-way valve 21 is communicated with the second branch 21c and the refrigerant liquid is combined with the refrigerant having been condensed in the outdoor side heat exchanger 5 and then is subjected to expansion at the expansion device 4. The flow of the refrigerant at the downstream side of the expansion device 4 is the same as the room cooling operation. In this case, more efficient operations can be obtained by adjusting performance of heat exchanging, for instance, by stopping a blower for the room side heat exchanger 5 or by changing revolution of the blower depending on a state of liquefaction of the refrigerant. Thus, waste heat produced at the time of cooling of a room can be effectively recovered as a heat source for water in the hot water tank.

In a water heating operation, heating of water in the hot water tank 6 is carried out as mentioned in the foregoing embodiments. In this case, two ways of flowing the refrigerant can be selected depending on a state of condensation of the refrigerant. Namely, when atmospheric temperature is relatively low, the flowing path in the room warming and water heating operation is taken, whereas atmospheric temperature is relatively high, the flowing path in the room cooling and water heating operation is taken. For instance, the temperature of water in the hot water tank 6 is low so that the refrigerant is not sufficiently condensed and atmospheric temperature is relatively low, the refrigerant is fed through the second branch 20c of the three-way valve 20 to enter into the pipeline between the room side heat exchanger 3 and the expansion device 4. The refrigerant expands in the expansion device 4 and is supplied to the outdoor side heat exchanger 5 where it evaporates to be refrigerant gas and returned to the compressor 1 through the four-way valve 2 as shown by broken arrow mark.

Control of switching the third three-way valve 20 can be performed by directly detecting a state of condensation of the refrigerant at the outlet side of the heating coil 8 but not detecting temperature of water in the hot water tank 6.

Figure 9:
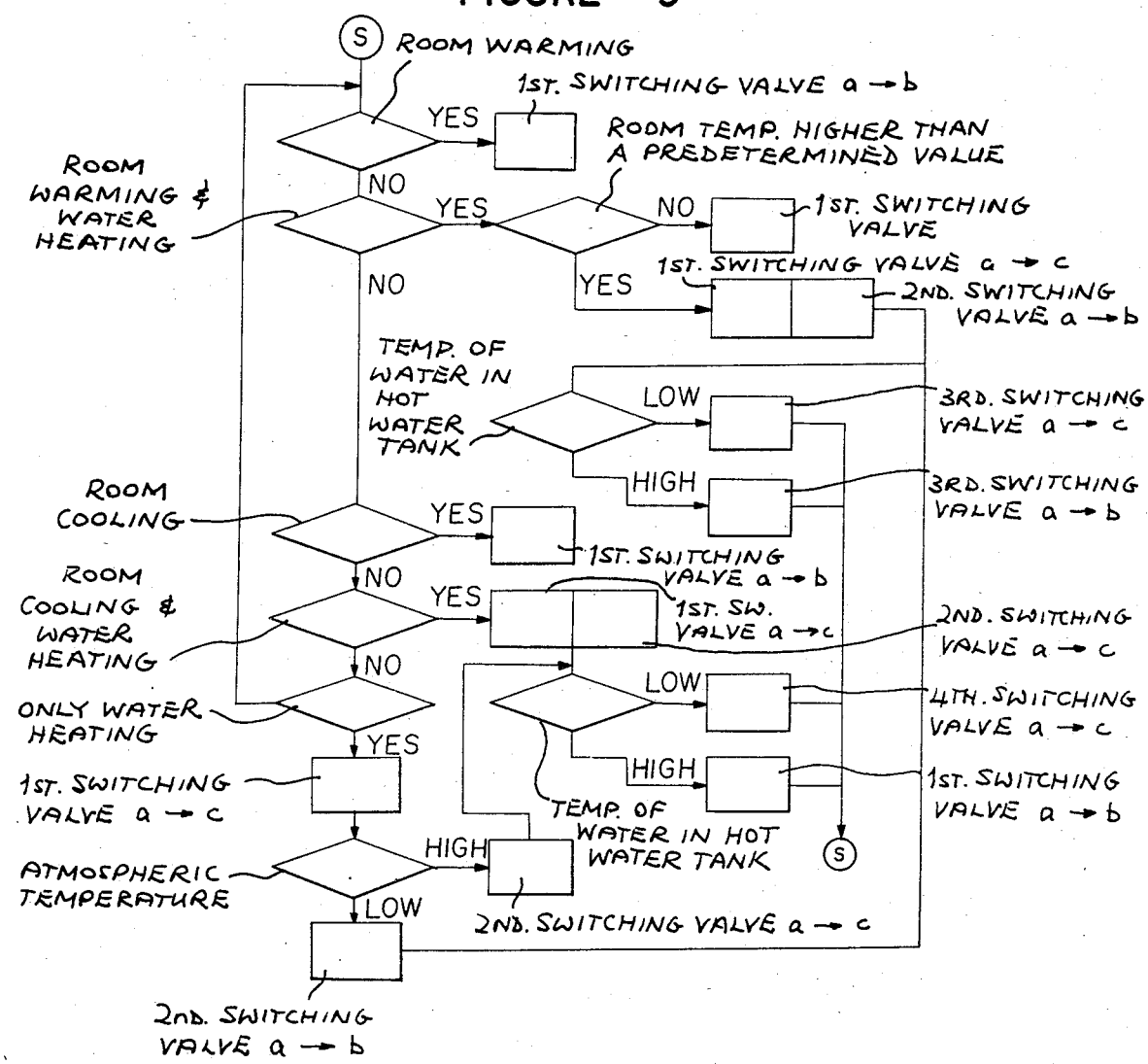
FIG. 9 is a flow chart showing the operation of each switching valve.

FIG. 9 shows a flow chart of control of each of the switching valves in each operation mode.

Sometimes, the outdoor side heat exchanger 5 is covered by frost and it is necessary to remove the frost. In this case, so-called reverse cycle operation in which the four-way valve 2 is switched as in the room cooling operation to feed the refrigerant gas of high temperature and high pressure to the outdoor side heat exchanger has been normally carried out. However, if rapid removal of the frost is required or heat energy of hot water in the hot water tank 6 is used for rapid removal of the frost, the following steps are taken. Namely, inlet 7a of the first three-way valve 7 is communicated with the second branch 7c; the refrigerant gas supplied from the compressor 1 is passed to the heating coil 8 to heat water in the hot water tank 6; the inlet 19a of the second three-way valve 19 is communicated with the second branch 19c and the inlet 21a of the fourth three-way valve 21 is communicated with the second branch to lead the refrigerant gas to the outdoor side heat exchanger 5 thereby to defrost the outdoor side heat exchanger. Then, the refrigerant is returned to the compressor 1 through the four-way valve 2. In this case, effective defrosting can be attained by closing expansion valves in the expansion device 4.

The operations as above-mentioned of the fourth embodiment is performed by controlling the first to the fourth three-way valves 7, 19, 20, 21 and the four-way valve 2 by means of the control device 16B. Capacity control of the compressor 1 can be performed by changing frequency of a power source for driving the compressor 1 by means of an inverter 12.

As described above, the apparatus according to the fourth embodiment of the present invention is provided with the first to the fourth switching means and the control device for performing switching control of the first to fourth switching means depending on each operating mode whereby room warming/cooling operations and water heating operation can be conducted simultaneously. Further, in this embodiment, there are advantages that water in the hot water tank is heated by waste heat produced at the time of cooling of a room; frost covering the outdoor side heat exchanger can be effectively removed and an economical apparatus can be provided.

The fifth embodiment of the present invention will be described with reference to FIG. 10 in which the same reference numerals as in FIG. 1 to 9 designate the same or corresponding parts and therefore description of these parts is omitted.

The fifth embodiment of the present invention particularly aims at providing a room warming/cooling and hot-water supplying heat-pump apparatus having high efficiency which controls the peak value of a load of electric power took place in the water heating operation by giving the first priority to the room warming operation and by heating water in a determined time zone in which an inverter is operated at a low frequency given by calculation.

Figure 10:
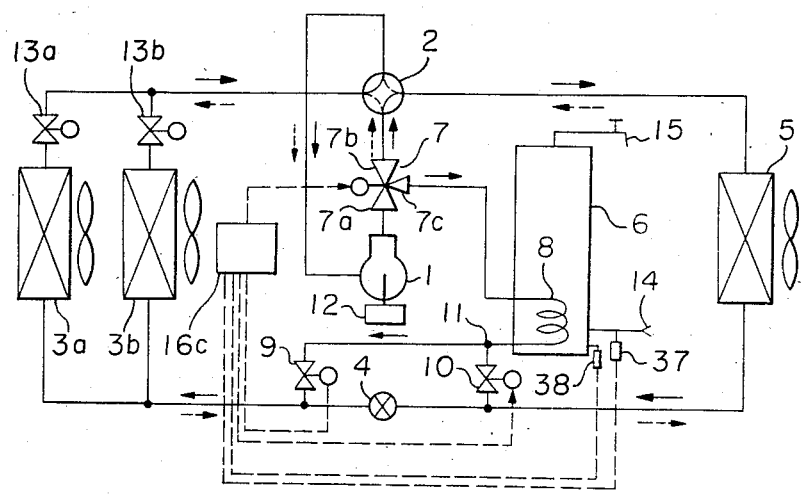
FIG. 10 is a diagram of the fifth embodiment of the present invention.

In FIG. 10, two room side heat exchangers are indicated by numerals 3a, 3b and two electromagnetic valves are indicated by numerals 13a, 13b respectively.

In FIG. 10, a reference numeral 38 designates a temperature detector for detecting temperature of water in the hot water tank 6 and an output from the temperature detector 38 is supplied to a control device 16C with timers. There is provided a city-water temperature detector 37 for detecting temperature of a city-water inlet 14 and an output of the detector is received in the control device 16C which controls switching of the three-way valve 7.

In the fifth embodiment, the flows of the refrigerant in the various operations are the same as the first and the fourth embodiments.

In the room warming operation, the first priority is given to the operation for warming room depending on a load of warming.

Figure 11:
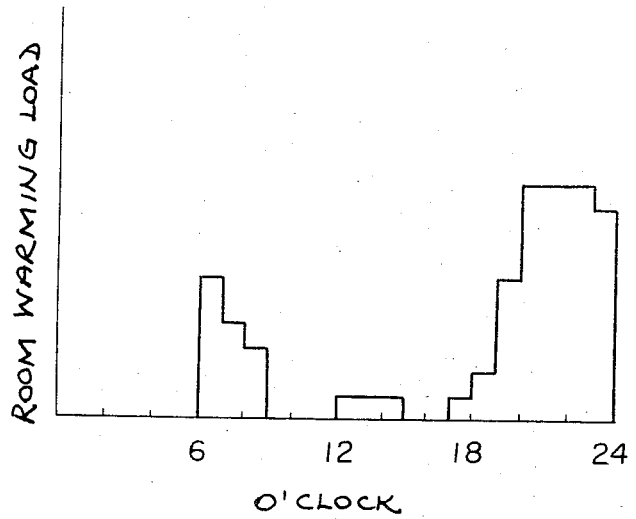
FIG. 11 shows a pattern of room warming load in houses.

Generally, there comes the first peak of load of warming room in houses in a time zone from about 6 o'clock to about 8 o'clock in the morning as shown in FIG. 11; there is a load depending on weather in the daytime and there is a peak in a time zone from the evening to about 24 o'clock.

In this embodiment, when a time zone for water heating operation is set in the daytime, water-heating time of about 4 to 5 hours is available.

The operation of this embodiment will be described with a flow chart of FIG. 13.

In mode selection at Step S1, if cooling mode is selected, the cooling operation is started at Step S2. If room warming mode or water heating mode is selected, then it goes to Step S3. If there is a load of room warming, a room warming operation is performed at Step S4.

If there is no load of room warming at Step S3, then goes to Step S5 in which temperature of hot water $T_H°$ C. is compared with a value of temperature (or predetermined value) input from the city-water temperature detector 37. At Step S6, time Tp required to heat water is set (for instance, 5 hours). Then, necessary water-heating performance (QdKcal/h) is obtainable from the following equation 1 (Step S7).

$$Qd = V \times (T_H - T_c)/tp \quad (1)$$

where V is volume of the hot water tank and $T_c$ is a predetermined value.

FIG. 12 shows a relationship of frequency (freq) for the interver 12 capable of providing the performance to rated water-heating performance (Qd). Since this relationship is previously given as the performance of a heat pump apparatus, frequency of the inverter is determined by the following equation (2) at Step S8 by using a value Qd obtained by the equation (1) and water heating operation is carried out at Step S9.

$$freq = f_1(Qd) \quad (2)$$

Thus, a highly efficient water heating operation is carried out at a low frequency by taking a long time as possible until water in the hot water tank 6 is boiled. If there takes place a load for room warming during the water heating operation, the water heating operation is temporarily stopped and is changed to the room warming operation. When the load for room warming is disappeared, the water heating operation is again started (Step S9) whereby time needed to heat water (tp) is obtained as a whole.

Figure 14:
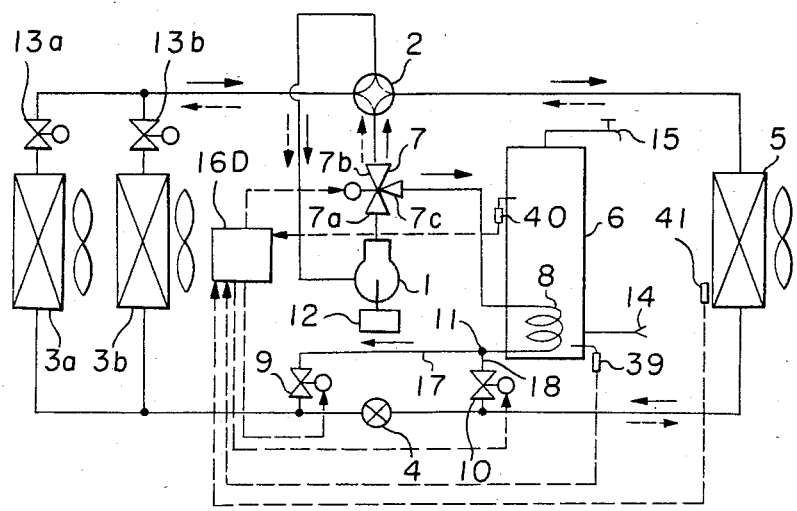
FIG. 14 is a diagram of the sixth embodiment of the present invention.

The sixth embodiment of the present invention will be described with reference to FIGS. 14 to 16. In FIG. 14, the same reference numerals as in FIG. 10 designate the same or corresponding parts and therefore description of these parts is omitted.

A reference numeral 16D designates a control device with timers for controlling the three-way valve 7 and the first and the second electromagnetic valves 9, 10. A temperature detector 39 and a temperature detector 40 are respectively provided at the lower part and the upper part of the hot water tank 6 and an atmospheric temperature detector 41 is provided at the outdoor side heat exchanger 5. Each detection signal from the temperature detectors is input to the control device 16D. The operation of the refrigerant is the same as the fifth embodiment and description concerning the operation is omitted.

There is a tendency that a load of room warming takes place in houses as shown in FIG. 11. If a time zone for performing a water heat operation is set in the daytime, time of about 4 to 5 hours for heating water is available.

Accordingly, temperature of water $T_3(°C.)$ in the hot water tank 7 can be obtained by using the following equation (3):

$$T_3 = [T_1 \times V_1 + T_2 \times (V - V_1)]/V \quad (3)$$

where V is capacity of the hot water tank 7, $V_1$ is capacity of the portion above the temperature detector 39 in the hot water tank, $T_2°$ C. is temperature of water of the lower part of the hot water tank, detected by the temperature detector 39, $T_1°$ C. is temperature detector 40. the upper part detected by the temperature detector 40.

An average temperature of water $T_4°$ C. reaching a boiled temperature $T_H$ of water in the hot water tank 7 which is previously input is determined by using the following equation (4):

$$T_4 = (T_3 + T_H)/2 \quad (4)$$

Figure 15:
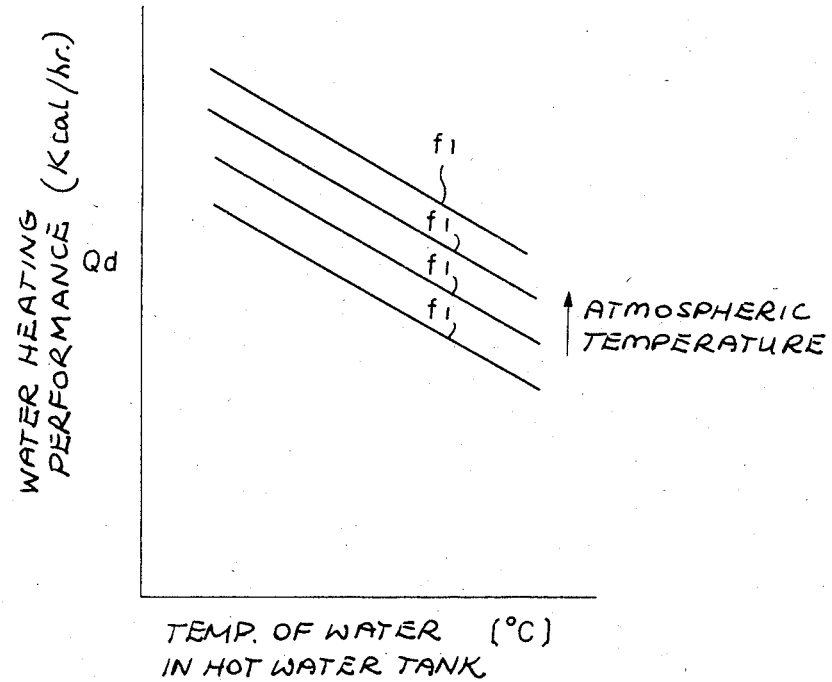
FIG. 15 is a diagram showing water heating performance curves in which the ordinate represents a water heating performance (kcal/h) and the abscissa represents temperature of water in the hot water tank (°C.)

Then, necessary water-heating performance Qd is obtained by using the following equation (5) which formulates performance curves shown in FIG. 15 which can be obtained from atmospheric temperature $T_0(°C.)$ detected by the atmospheric temperature detector 41 and temperature of water in the hot water tank 7:

$$Qd = f_1(T_4, T_0) \quad (5)$$

Finally, an operation frequency of the inverter is determined by using the following equation (6) showing a relationship of Qd to the frequency of the inverter:

$$freq = f_2(Qd) \quad (6)$$

Thus, a highly efficient water heating operation is carried out at a low frequency by taking time as long as possible. If a load of room warming takes place during the water heating operation, the operation is temporarily stopped and the room warming operation is started. However, when the room warming load disappears, the water heating operation is restarted. Totally, water in the hot water tank 7 is boiled by the time tp needed to heat water.

Figure 16:
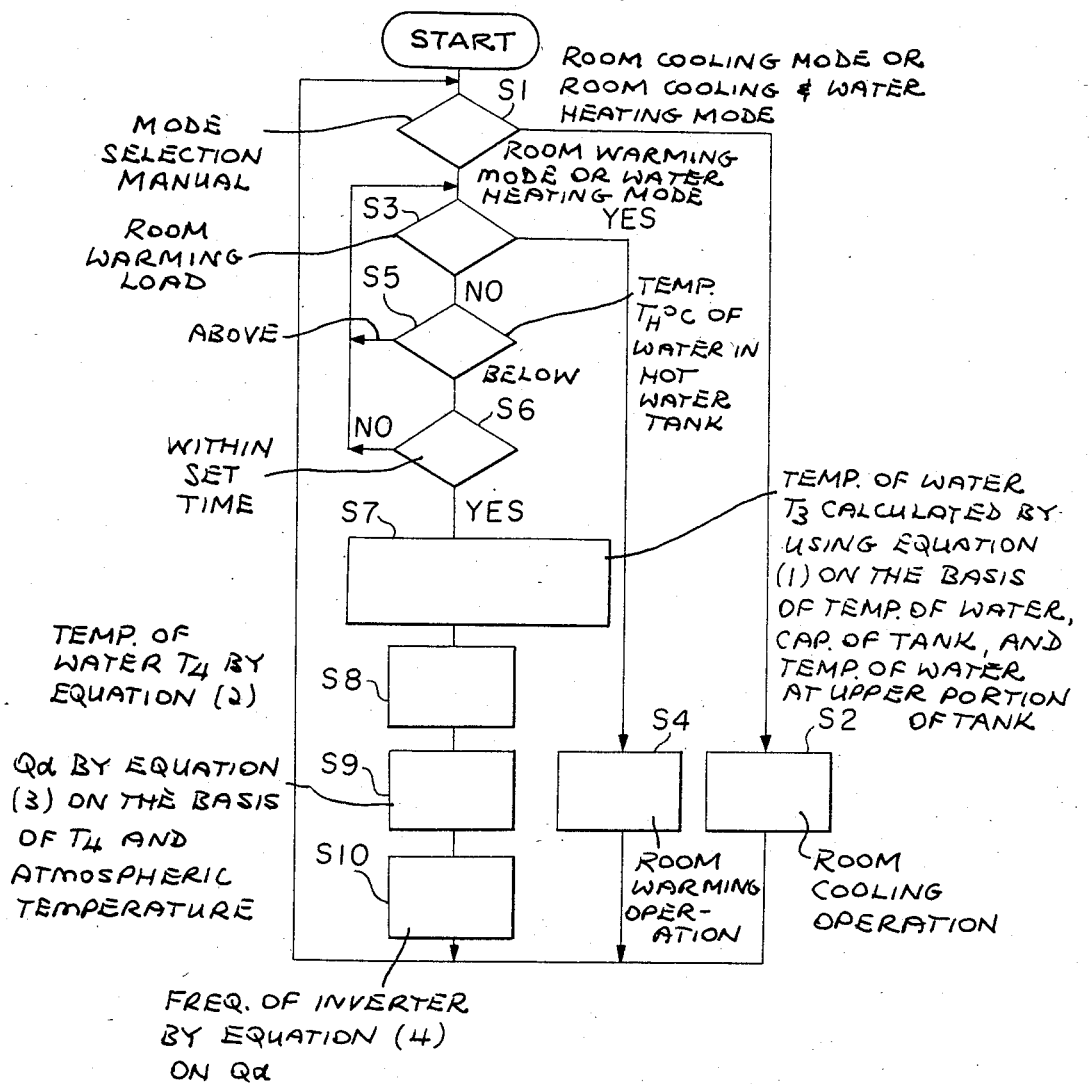
FIG. 16 is a flow chart showing a sequence of each operating mode of the sixth embodiment of the present invention.

FIG. 16 shows a flow chart of each operating mode as described above.

Mode selection is carried out at Step $S_1$. When cooling mode is selected, then cooling operation is started at Step $S_2$ and when room warming mode or water heating mode is selected, then it goes to Step $S_3$.

When there is a load of room-warming, the room-warming operation is started at Step $S_4$. When there is no load of room-warming at Step $S_3$, then it to Step $S_5$. In Step $S_5$, the capacity of the hot water tank (V liter), the capacity of upper portion of the hot water tank ($V_1$), the temperature of water of the upper portion of the hot water tank ($T_1$) and the temperature of water of the lower portion of the tank ($T_2$) are given. Time for heating water is given at Step $S_6$. Then, the temperature of water ($T_3$) of the hot water tank is obtained from the following equation (3) at Step $S_7$:

$$T_3 = \{T_1 \times V_1 + T_2(V - V_1)\}/V \tag{3}$$

An average temperature of water $T_4$ up to temperature of boiled water $T_1$ is obtained from the following equation (4) at Step $S_3$:

$$T_4 = (T_3 + T_H)/2 \tag{4}$$

At Step $S_9$, performance necessary to heat water $Qd$ is obtained from the following equation (5) by using performance curves shown in FIG. 15 which are obtained by the temperature of water $T_3$ in the hot water tank and atmospheric temperature $T_0$:

$$Qd = f_1(T_4, T_0) \tag{5}$$

The operating frequency of the inverter is determined by using the value $Qd$ at Step $S_{10}$ as follows:

$$freq = f_2(Qd) \tag{16}$$

and the water heating operation of highly efficient can be carried out at a low frequency by taking time as long as possible.

Figure 17:
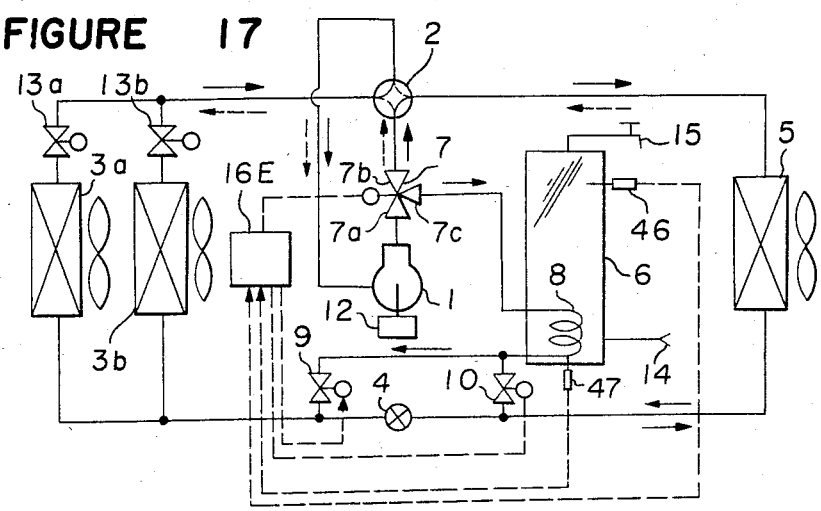
FIG. 17 is a diagram of the seventh embodiment of the present invention.

FIG. 17 is a diagram showing the seventh embodiment of the present invention which is modified embodiment of the fifth and sixth embodiments. In FIG. 17, the same reference numerals as in the previous figures designate the same or corresponding parts.

A reference numeral 16E designates a control device with timers for controlling the three-way valve 7, the electromagnetic valves 9, 10 and the inverter 12 for capacity control of the compressor 1. A temperature detector 46 and a temperature detector 47 are respectively provided at upper and lower portions of the hot water tank 6 and detection signals from the temperature detectors 46, 47 are input in the control device 16E.

The operation of the seventh embodiment is the same as that of the first and fifth embodiment and therefore description is omitted.

In a room-warming operation, there is condition of a load of room-warming as shown in FIG. 11 previously mentioned. In the seventh embodiment of the present invention, revolution of the compressor 1 is controlled by the inverter 12 and a plurarity of water heating mode are given and a suitable mode is selected depending on condition of a load to increase economical advantage.

Figure 18:
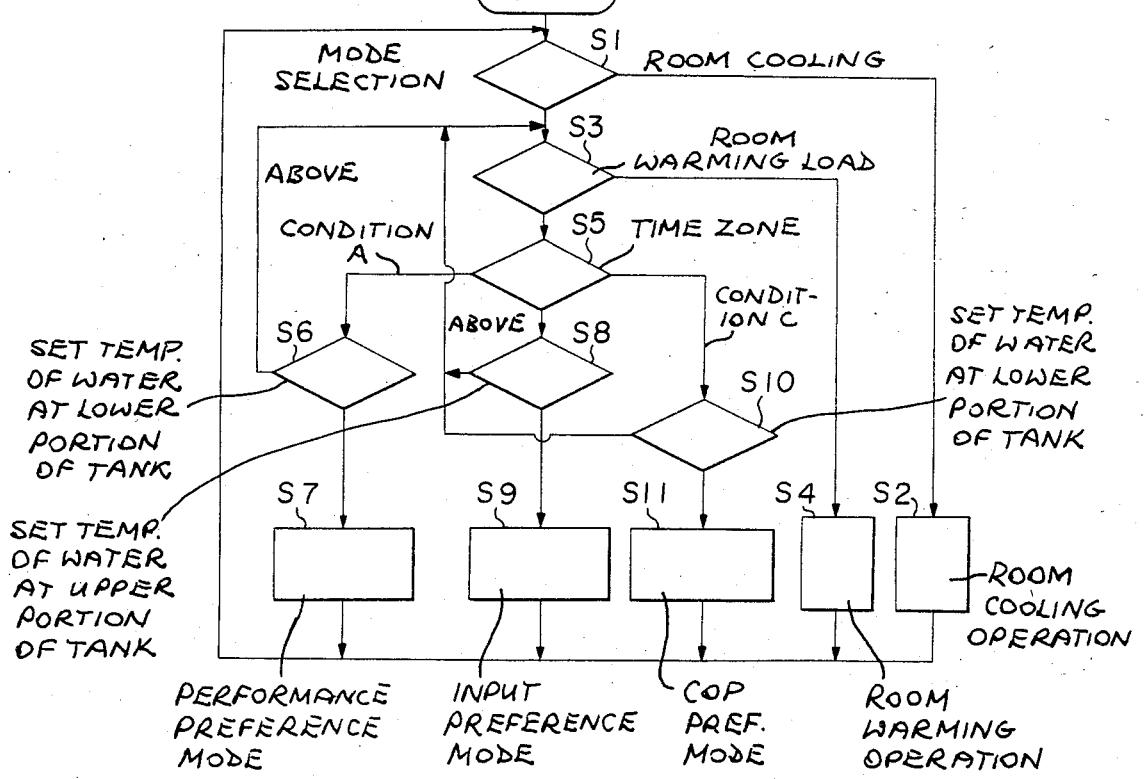
FIG. 18 is a flow chart showing operations of the seventh embodiment of the present invention.
Figure 19:
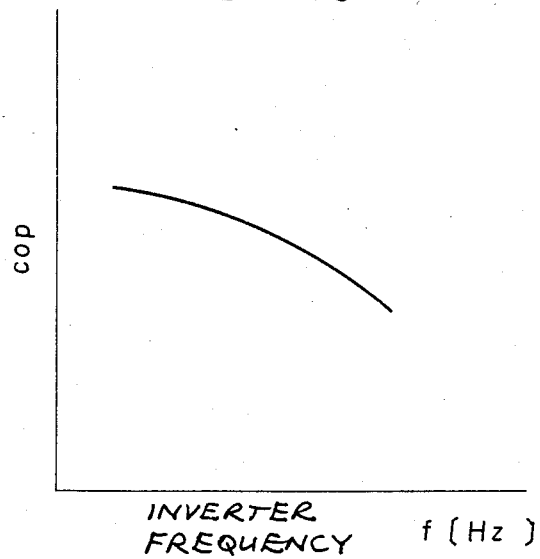
FIG. 19 is a diagram showing a relationship of COP to the frequency of an inverter.

FIG. 18 is an operating flow chart.

A program to control the apparatus is stored in an inner memory of the control device 16E. In FIG. 18, the operating mode is selected by manual operation at Step $S_1$. When Step $S_1$ is judged to be room-cooling mode, a room-cooling operation is started at Step $S_2$ by controlling the three-way valve 7 and the electromagnetic valves 9, 10. When Step $S_1$ is judged to be another mode other than the room cooling mode, judgement is made as to whether there is a room-warming load at Step $S_3$. When the room-warming load is present, a room-warming operation is started at Step $S_4$. When the room-warming load is absent at Step $S_3$, any condition A, B or C is taken depending on time zones at Step $S_5$.

In the course of the condition A (Step $S_6$), the temperature of water in the hot water tank is detected by the temperature detector 47 positioned at the lower part of the tank. When the detected temperature is lower than a predetermined temperature, a water heating operation is started according to performance preference mode (Step $S_7$). When the detected temperature is higher than the predetermined temperature, the operation is returned to Step $S_3$.

The performance preference mode means that the inverter is driven at a high speed which imparts a high performance. In this case, frequency of the inverter is related to a rated water heating performance as shown in FIG. 12. The time zone of the condition A is from time several hours before when a large load of heating water is produced to time when the large load of heating water disappears.

In the condition B (Step $S_8$), the temperature of water in the hot water tank is detected by the temperature detector 46 positioned at the upper part of the tank. When the detected temperature is lower than a predetermined temperature, a water heating operation is started according to input preference mode (Step $S_9$). When the detected temperature is higher than the predetermined temperature, the operation is returned to Step $S_3$. The purpose of using a water temperature at the upper part of the hot water tank is to keep a minimum amount of hot water.

The input preference mode means an operation with a level of input lower than a predetermined value and the time zone is referred to one in which the peak of a power load appears.

In the condition C (Step $S_{10}$), the temperature of water in the hot water tank is detected by the temperature detector 47 positioned at the lower part of the hot water tank. When the detected temperature is lower than a predetermined temperature, the water heating operation is started according to COP preference mode (Step $S_{11}$). When the detected temperature is higher than the predetermined temperature, the operation is returned to Step $S_3$.

The COP preference mode means that the inverter is driven at a low speed to increase COP (coefficient of performance). The time zone of the condition C a means time zone other than conditions A and B.

Thus, in accordance with the seventh embodiment, the water heating mode is divided into three modes and the optimum operation is performed for each time zone. Namely, in a time zone in which the peak of a power load takes place, an operation is made to control the consumption of power. In a time zone just before occurrence of a large load of heating water, an operation is carried out at a high performance to boil water in the hot water tank. The time zone other than the above-mentioned cases, a high COP operation is carried out so that the temperature of water in the hot water tank is gradually increased from the economical view point.

Figure 20:
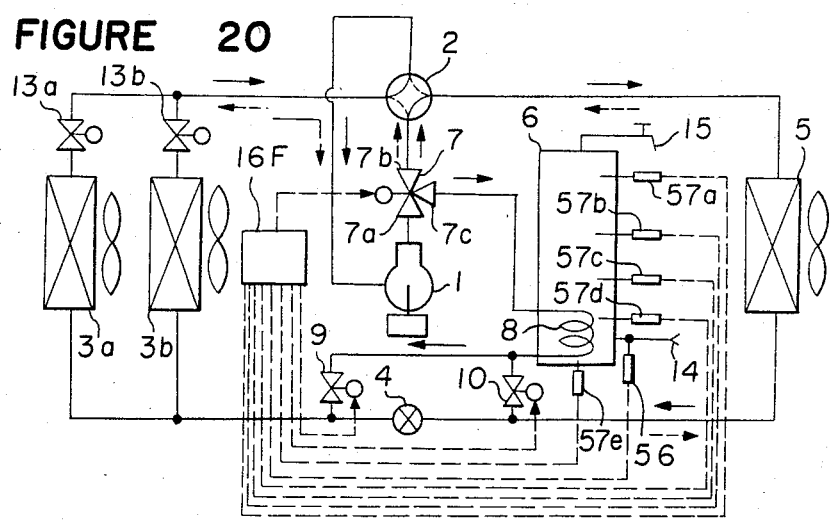
FIG. 20 is a diagram showing the eighth embodiment of the present invention.

FIG. 20 is a diagram of the eighth embodiment of the present invention. In FIG. 20, the same reference numerals as in FIGS. 1 to 19 designate the same or corresponding parts.

The apparatus of the eighth embodiment is so constructed as to control revolution of the compressor 1 by the inverter with respect to an amount of water remaining in the hot water tank.

In FIG. 20, a reference numeral 16F designates a control device with timers for controlling the inverter 12, the three-way valve 7 and the electromagnetic valves 9, 10. A temperature detector 56 is placed at the lower part of the hot water tank 6 to detect temperature of water at the lower part and a plurality of temperature detectors 57a–57e are placed at the upper parts of the hot water tank 6. Each detected signal from the detectors is input to the control device 16F.

The operation of the eighth embodiment is the same as the first and the fifth embodiments and therefore description is omitted.

There is condition of a room-warming load in houses as shown in FIG. 11.

The operation of the control device 16F will be described.

Figure 21:
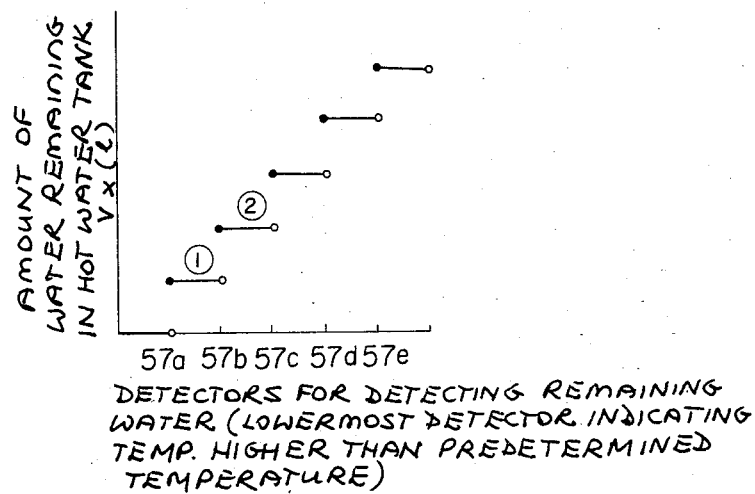
FIG. 21 is a characteristic diagram showing a relationship of a remaining water detection sensor to the quantity of remaining water.

The control device 16F detects an amount of water remaining in the hot water tank by receiving temperature signals from temperature detectors 57a–57e. In this case, a water stream in the hot water tank assumes a piston stream in the case of a water heating load. A high temperature portion at the upper part and a low temperature portion at lower part of the hot water tank are distinctly separated and there is temperature difference of about several 10° C. Accordingly, when value in temperature detected by the plural temperature detectors is higher than a predetermined value, an amount of water remaining in the hot water tank can be obtained because the positions of the detectors are known. It is determined that there remains water above the position of the detector 57a in the case that a temperature detected by the detector 57a is higher than a predetermined value as shown by a numeral 1 in FIG. 21. Similarly, there remains water above the detector 57b when temperature detected by the sensor 57b is higher than a predetermined value. Namely, the amount of water remaining in the hot water tank is determined by the lowest detector which indicates a temperature higher than a predetermined value.

Figure 22:
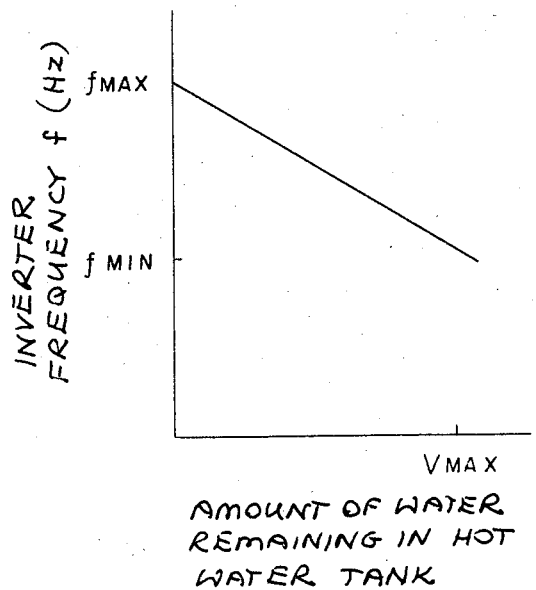
FIG. 22 is a characteristic diagram showing a relationship of the quantity of remaining water to the frequency of an inverter.
Figure 23:
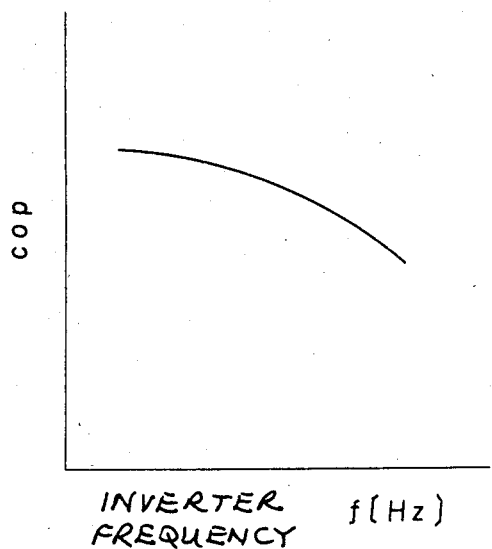
FIG. 23 is a characteristic diagram showing a relationship of the output frequency of an inverter to COP.

The frequency of the inverter at the time of heating water is determined by the following equation which is memorized in a micro computer installed in the control device 16F:

$$f = f_{MAX} - (f_{MAX} - f_{MIN})/V_{MAX} \times V_X$$

where f is frequency of operation, $f_{MAX}$ is a maximum frequency, $f_{MIN}$ is a minimum frequency, $V_{MAX}$ is capacity of a hot water tank and $V_X$ is an amount of water remaining in the tank. The value of $V_X$ changes discretely; however, an output frequency of the inverter changes depending on the value as shown in FIG. 22. Namely, as the frequency of the inverter decreases, water heating performance also decreases as shown in FIG. 12. On the other hand, COP is gradually increased as shown in FIG. 23. Thus, when the quantity of remaining water is small, priority is given to performance, and when the quantity of water is large, priority is given to COP. The priority of COP means that the inverter is operated at a low frequency or the lowest frequency which renders COP for the inverter to be high.

Thus, in the eighth embodiment of the present invention, an amount of water in the hot water tank is detected and an output frequency of the inverter is controlled depending on the amount of water so that an economical operation is attainable.

The ninth embodiment of the present invention will be described with reference to FIG. 24.

Figure 24:
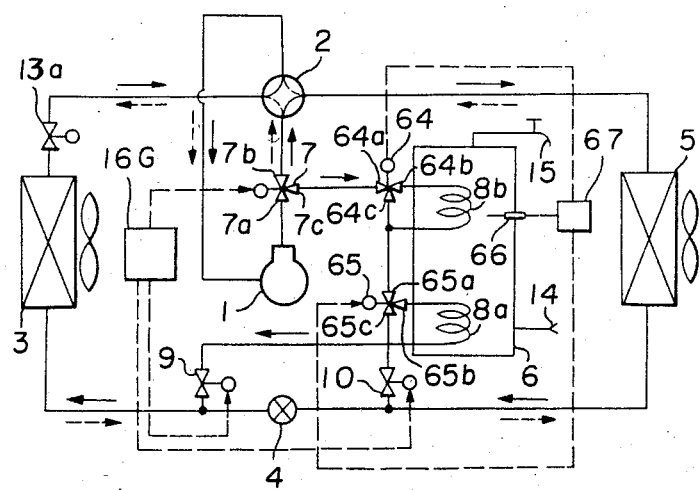
FIG. 24 is a diagram of the ninth embodiment of the present invention.

In FIG. 24, the same reference numerals as in FIGS. 1 to 23 designate the same or corresponding parts and therefore description of these parts is omitted.

The ninth embodiment of the present invention is to assure the temperature of hot water at a faucet.

In FIG. 24, a heating coil 8b is additionally provided at the upper part of the hot water tank 6 to assure the temperature of water at the faucet 15. Electromagnetic three-way valves 64, 65 are respectively provided for the upper and lower heating coils 8b, 8a. The three-way valves 64, 65 are connected in series to a pipeline between the second branch 7c of the three-way valve 7 and the junction of the electromagnetic valves 9, 10. One end of the upper heating coil 8b is connected to the first branch 64b of the three-way valve 64 and the other end of the upper heating coil 8b is connected to the pipeline at the side of the second branch 64c. One end of the lower heating coil 8a is connected to the first branch 65b of the three-way valve 65 and the other end of the lower heating coil 8a is connected the pipeline at the side of the second branch 65c.

A reference numeral 66 is a temperature sensor for detecting temperature of water in the upper part of the hot water tank 6 and a numeral 67 designates a control device for controlling and switching the three-way valves 64, 65 on the basis of a temperature detected by the temperature sensor 66.

The operation of the ninth embodiment of the present invention will be described.

In the water heating operation, when the temperature of a certain amount of water in the hot water tank 6 is lower than a predetermined temperature, a signal is supplied from the temperature sensor 66 to the control device 67 whereby the control device 67 actuates the three-way valve 64 to communicate the inlet 64a with the first branch 64b and it actuates the three-way valve 65 to communicate the inlet 65a with the second branch 65c. Accordingly, the refrigerant of a high temperature and high pressure discharged from the compressor 1 is passed through the inlet 64a and the first branch 64b to the upper heating coil 8b, where it is condensed while heating water at the upper part of the hot water tank 6. Then, the condensed refrigerant is passed through the inlet 65a, the second branch 65c, the electromagnetic valves 9, 10, the room side or outdoor side heat exchanger 3 or 5 and the four-way valve 2 to be returned to the compressor 1.

When the temperature of a certain amount of water in the hot water tank 6 is higher than the predetermined temperature, a signal is supplied from the temperature sensor 66 to the control device 67 whereby the control device 67 actuates the three-way valve 64 to communicate the inlet 64a with the second branch 64c and at the same time actuates the three-way valve 65 to communicate the inlet 65a with the first branch 65b. The flow path of the refrigerant is the same as above-mentioned embodiments except that the refrigerant is passed through the inlet 65a and the first branch 65b of the three-way valve 65 and the lower heating coil 8a.

Thus, in the ninth embodiment of the present invention, water at a high temperature is always stored in the upper part of the hot water tank 6 and the temperature of hot water at the faucet is assured even though water in the tank 6 is not entirely boiled.

Figure 25:
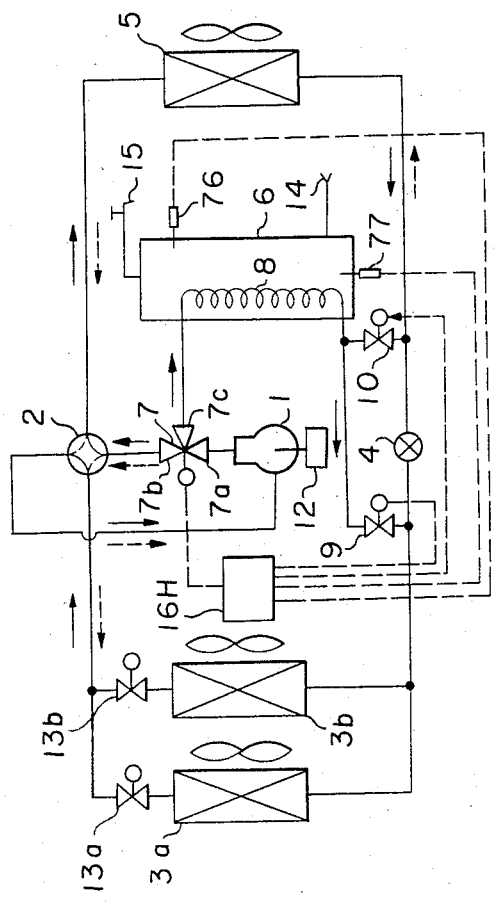
FIG. 25 is a diagram of the tenth embodiment of the present invention.

The tenth embodiment of the present invention will be described with reference to FIG. 25. In FIG. 25, the same reference numerals designate the same or corresponding parts and therefore description of these parts is omitted.

In FIG. 25, a heating coil 8 in a coiled form is provided in the hot water tank 6 and one end of the heating coil 8 is connected to the second branch of the three-way valve 7 while the other end of the heating coil 8 is connected to a pipeline at both sides of the expansion device 4 through the respective electromagnetic valves 9, 10. A control device 16H with timers receives input signals from a city water temperature detector 76 and a detector 77 for detecting temperature of water at the lower part of the hot water tank 6.

The upper temperature detector 76 detects whether a level of hot water in the hot water tank 6 is higher or lower than a predetermined value and the lower temperature detector 77 detects whether water in the hot water tank is entirely boiled. Namely, when a large amount of hot water is needed for a bath in the evening or at night, an operation for heating water in the hot water tank is contolled by the lower temperature detector 77 and when a small amount of hot water is sufficient in the midnight, a heating operation is controlled by the upper temperature detector 76. In this embodiment, when a large amount of water is used for a bath and a necessary amount of water is not remained, a water heating operation is started so that heated water is stored from the upper part of the hot water tank in order. When the upper temperature detector 76 detects that the water temperature reaches a predetermined value, the water heating operation is stopped.

Thus, the tenth embodiment of the present invention is so constructed that the heating coil in a coiled form and two temperature detectors are provided in the hot water tank. Accordingly, only water at the upper part of the hot water tank can be heated and a substantial amount of water in the hot water tank is boiled in the daytime having a relatively high atmospheric temperature whereby coefficient of performance (COP) can be increased. Further, heat loss in the hot water tank can be minimized because water is heated just before occurrence of a large load of heating water for a bath at night.

In the embodiments described above, one or two room side heat exchangers 3 are used. However, three or more number of the room side heat exchangers may be used. Further, for switching operation, the same effect can be obtained by using two-way valves instead of a single three-way valve. A power-operated valve capable of adjusting a flow rate may be used as a three-way valve. In addition, although a pneumatic type room side and the outdoor side heat exchangers are used in the embodiments described above, hydraulic type heat exchangers may be used. Further, although capacity control of the compressor is carried out by using an inverter, the capacity control may be performed by providing a plurality of compressors in which a requisite number of compressors may be operated by a control device.

We claim:

1. A room-warming/cooling and hot-water supplying heat-pump apparatus comprising a refrigerant circuit provided with a compresser, a four-way valve for switching room warming and cooling operations, a room side heat exchanger, a reversible flow type expansion device and an outdoor side heat exchanger, characterized in that a first switching means is connected to the outlet side of said compressor; a first branch of said switching means is connected to said four-way valve and a second branch of said first switching means is connected to one end of a heating coil in a hot water tank; the other end of said heating coil extends out of said hat water tank and has a branched part, wherein a pipeline including said branched part has both ends connected to said refrigerant circuit at both sides of said expansion device in which at least one valve means is provided in said pipeline including said branched part and said first switching means and said valve means are controlled by a control device.

2. The heat pump apparatus according to claim 1, wherein said first switching means is a three-way valve.

3. The heat pump apparatus according to claim 1, wherein one end of said pipeline including said branched part is connected to said refrigerant circuit between said expansion device and said room side heat exchanger through a first electromagnetic valve, and the other end of said pipeline is connected to said refrigerant circuit between said expansion device and said outdoor side heat exchanger through a second electromagnetic valve 4. The heat pump apparatus according to claim 1, wherein one end of said pipeline including said branches part is connected to said refrigerant circuit between said room side heat exchanger and said four-way valve through a first electromagnetic valve, and the other end of said pipeline is connected to said refrigerant circuit between said outdoor side heat exchanger and said four-way valve through a second electromagnetic valve.

5. The heat pump apparatus according to claim 1, wherein said valve means is provided at said branched part.

6. The heat pump apparatus according to claim 5, wherein said valve means is a second three-way valve and a first branch of said three-way valve is connected to said refrigerant circuit between said room side heat exchanger and said four-way valve, and a second branch of said three-way valve is connected between said outdoor side heat exchanger and said four-way valve.

7. The heat pump apparatus according to claim 1, wherein a second three-way valve is provided at said branched part; a first branch of said of said second three-way valve is connected to an inlet of a third three-way valve while a second branch of said second three-way valve is connected to an inlet of a fourth three-way valve; a first branch of said third three-way valve is connected to said refrigerant circuit between said room side heat exchanger and said four-way valve; a second branch of said third three-way valve is connected between said room side heat exchanger and said expansion device; a first branch of said fourth three-way valve is connected to said refrigerant circuit between said outdoor side heat exchanger and said four-way valve and a second branch of said fourth three-way valve is connected between said outdoor side heat exchanger and said expantion device.

8. The heat pump apparatus according to claim 1, wherein said compressor is constituted by a plurality of compressor having a small capacity so that a necessary number of said compressors are driven by said control device.

9. The heat pump apparatus according to claim 1 which comprises an inverter for changing revolution of said compressor to operate it at a low frequency in a predetermined time period, while the first priority is given to warming a room in a room warming operation.

10. The heat pump apparatus according to claim 9, which comprises a city water temperature detector and a temperature detector for hot water in said hot water tank.

11. The heat pump apparatus according to claim 9, wherein said hot water tank is provided with a lower temperature detector and an upper temperature detector.

12. The heat pump apparatus according to claim 9, wherein said outdoor side heat exchanger is provided with an atmospheric temperature detector.

13. The heat pump apparatus according to claim 1, wherein said control device with timers performs such operations that when water heating mode becomes a condition A (performance preference mode), an inverter is operated at a higher or the maximum frequency; the water heating mode becomes a condition B (input preference mode), operation is made with an input power lower than a predetermined valve, and the water heating mode becomes a condition C (COP preference mode), said inverter is operated at a lower or the maximum frequency to perform high COP operation.

14. The heat pump apparatus according to claim 1, wherein said control device changes the output frequency of an inverter depending on the quantity of water remaining in said hot water tank at the time of starting the operation to thereby control revolution of said compressor.

15. The heat pump apparatus according to claim 1, wherein an additional heating coil is provided at the upper part of said hot water tank to assure temperature of hot water to be supplied from a faucet and an additional switching means is provided to switching supply of refrigerant from said compressor to either of said heat coils.

16. The heat pump apparatus according to claim 1, wherin temperature detectors are respectively provided at the upper and lower parts of said hot water tank and said control device with timers receives signals from said temperature detectors to open and close said valve means and said switching means.

* * * * *